(12) United States Patent
Lupescu

(10) Patent No.: US 8,413,433 B2
(45) Date of Patent: Apr. 9, 2013

(54) HYDROCARBON RETAINING AND PURGING SYSTEM

(75) Inventor: Jason Lupescu, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 972 days.

(21) Appl. No.: 12/237,620

(22) Filed: Sep. 25, 2008

(65) Prior Publication Data

US 2010/0011746 A1 Jan. 21, 2010

Related U.S. Application Data

(60) Provisional application No. 61/081,686, filed on Jul. 17, 2008.

(51) Int. Cl.
  *F02M 25/06* (2006.01)
  *F02M 33/02* (2006.01)
  *F01N 3/00* (2006.01)
(52) U.S. Cl. .............. 60/299; 60/278; 60/283; 60/290; 60/297; 123/518; 123/519; 123/520
(58) Field of Classification Search .............. 60/274, 60/297, 299, 311, 278, 279, 283; 123/519, 123/520, 521
  See application file for complete search history.

(56) References Cited

U.S. PATENT DOCUMENTS

| | | | |
|---|---|---|---|
| 3,699,683 A | 10/1972 | Tourtellotte et al. | |
| 3,757,521 A | 9/1973 | Tourtellotte et al. | |
| 4,070,828 A * | 1/1978 | Barres | 60/274 |
| 5,021,071 A | 6/1991 | Reddy | |
| 5,051,244 A * | 9/1991 | Dunne et al. | 423/212 |
| 5,125,231 A | 6/1992 | Patil et al. | |
| 5,140,811 A | 8/1992 | Minami et al. | |
| 5,207,734 A | 5/1993 | Day et al. | |
| 5,239,824 A | 8/1993 | Matsumoto | |
| 5,272,873 A | 12/1993 | Hamazaki | |
| 5,273,020 A | 12/1993 | Hayami | |
| 5,307,627 A | 5/1994 | Christensen et al. | |
| 5,331,809 A | 7/1994 | Takeshima et al. | |
| 5,388,558 A | 2/1995 | Plapp et al. | |
| 5,589,143 A * | 12/1996 | Mori et al. | 422/171 |
| 5,619,973 A | 4/1997 | Hara et al. | |

(Continued)

FOREIGN PATENT DOCUMENTS

| | | |
|---|---|---|
| EP | 0957243 | 11/1990 |
| GB | 2254014 | 9/1992 |

(Continued)

OTHER PUBLICATIONS

English Machine Translation of JP 06101461 A to Shioyama et al.*

(Continued)

*Primary Examiner* — Thomas Denion
*Assistant Examiner* — Anthony Ayala Delgado
(74) *Attorney, Agent, or Firm* — Julia Voutyras; Alleman Hall McCoy Russell & Tuttle LLP

(57) ABSTRACT

Methods and systems are provided for reducing hydrocarbon emissions from an engine having a hydrocarbon retaining system. One example method comprises flowing exhaust gas over a hydrocarbon trap, the trap having a plurality of layers with different porosity and/or a different adsorptive affinity to hydrocarbon chains, and flowing hydrocarbons from a fuel tank over the hydrocarbon trap.

16 Claims, 6 Drawing Sheets

U.S. PATENT DOCUMENTS

| | | | |
|---|---|---|---|
| 5,744,103 A * | 4/1998 | Yamada et al. | 422/171 |
| 5,806,304 A | 9/1998 | Price et al. | |
| 5,814,287 A * | 9/1998 | Adamczyk et al. | 423/213.7 |
| 5,916,133 A | 6/1999 | Buhrmaster et al. | |
| 5,941,068 A | 8/1999 | Brown et al. | |
| 5,946,906 A | 9/1999 | Akazaki et al. | |
| 5,957,114 A * | 9/1999 | Johnson et al. | 123/519 |
| 6,003,309 A | 12/1999 | Agustin et al. | |
| 6,102,003 A | 8/2000 | Hyodo et al. | |
| 6,122,908 A | 9/2000 | Wirmark | |
| 6,247,457 B1 | 6/2001 | Mallebrein | |
| 6,463,907 B1 | 10/2002 | Hiltner | |
| 6,560,959 B2 | 5/2003 | Katsuta et al. | |
| 6,606,855 B1 | 8/2003 | Kong et al. | |
| 6,625,978 B1 | 9/2003 | Eriksson et al. | |
| 6,823,664 B2 | 11/2004 | Nakatani et al. | |
| 6,901,743 B2 | 6/2005 | Asanuma et al. | |
| 6,971,375 B2 | 12/2005 | Amano et al. | |
| 7,007,459 B2 | 3/2006 | Lee | |
| 7,331,334 B2 | 2/2008 | Leone et al. | |
| 2001/0006934 A1 * | 7/2001 | Kachi et al. | 502/325 |
| 2002/0140138 A1 * | 10/2002 | Wu et al. | 264/630 |
| 2003/0083193 A1 * | 5/2003 | Takaya et al. | 502/304 |
| 2003/0106306 A1 | 6/2003 | Nakatani et al. | |
| 2003/0213232 A1 | 11/2003 | Brisley et al. | |
| 2004/0076566 A1 | 4/2004 | Unger et al. | |
| 2005/0155587 A1 | 7/2005 | Suzuki | |
| 2005/0166577 A1 | 8/2005 | Chandler et al. | |
| 2005/0205472 A1 | 9/2005 | Boertje et al. | |
| 2006/0053771 A1 | 3/2006 | Murata et al. | |
| 2006/0254266 A1 | 11/2006 | Chandler et al. | |
| 2007/0113831 A1 * | 5/2007 | Hoke et al. | 123/519 |
| 2008/0020922 A1 * | 1/2008 | Li et al. | 502/73 |
| 2008/0110441 A1 | 5/2008 | Leone et al. | |

FOREIGN PATENT DOCUMENTS

| | | | |
|---|---|---|---|
| JP | 06101461 A * | 4/1994 | |
| JP | 10121949 | 5/1998 | |
| JP | 09004440 | 7/1998 | |
| JP | 10252449 | 9/1998 | |
| JP | 2002/188434 | 7/2002 | |
| WO | 96/29141 | 9/1996 | |

OTHER PUBLICATIONS

U.S. Appl. No. 12/147,292, filed Jun. 26, 2008, Gandhi et al.
U.S. Appl. No. 12/147,287, filed Jun. 26, 2008, Uhrich et al.
U.S. Appl. No. 12/147,285, filed Jun. 26, 2008, Uhrich et al.
U.S. Appl. No. 12/147,281, filed Jun. 26, 2008, Uhrich et al.
U.S. Appl. No. 12/147,263, filed Jun. 26, 2008, Elwart et al.
U.S. Appl. No. 12/147,251, filed Jun. 26, 2008, Elwart et al.
Yamazaki, H. et al., "Research on HC Adsorption Emission System", SAE Technical Paper Series No. 2004-01-1273, 2004 SAE World Congress, Detroit, Michigan, Mar. 8-11, 2004, 11 pages.

* cited by examiner

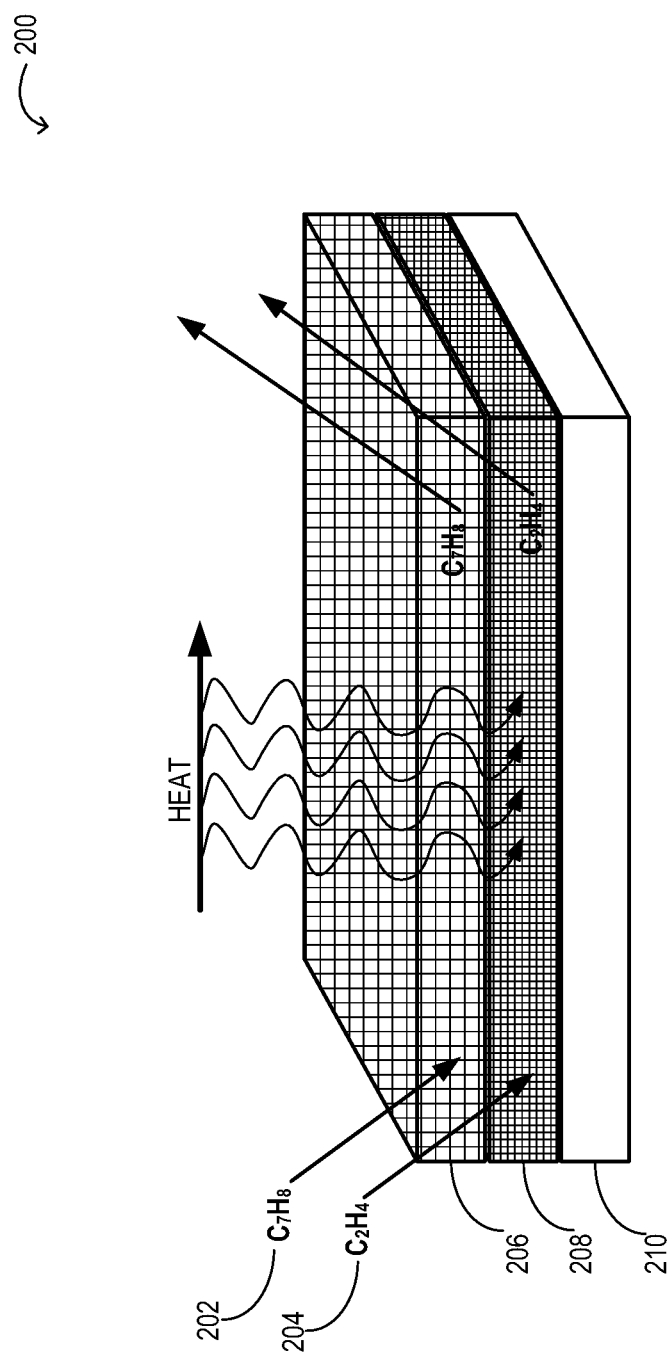

HYDROCARBON RETAINING AND PURGING SYSTEM

CROSS-REFERENCE TO RELATED APPLICATIONS

This application claims priority from U.S. Provisional Patent Application No. 61/081,686 of Jason Lupescu, entitled "HYDROCARBON RETAINING AND PURGING SYSTEM," filed Jul. 17, 2008, the disclosure of which is hereby incorporated by reference in its entirety and for all purposes.

FIELD

The present description relates generally to an exhaust treatment system for a combustion engine.

BACKGROUND/SUMMARY

Engine out cold-start hydrocarbon emissions generated before light-off of an exhaust system catalytic converter are responsible for a large percentage of the total exhaust hydrocarbon (HC) emissions. Accordingly, to meet stringent federal government emissions standards, engine exhaust systems have been developed that utilize hydrocarbon retaining devices, such as hydrocarbon traps, to retain cold start emissions for later reaction (HC storing), or for recirculation into the engine intake system (HC purging).

However, the inventors herein have recognized several problems therein. As one example, engines may operate with varying fuel compositions thereby producing exhaust emissions that may have different adsorption and/or desorption characteristics. For example, flex-fuel vehicles that operate on fuel having a varying alcohol composition (e.g., ranging from gasoline (E0) to ethanol (E85)) may have significantly different exhaust compositions. In one example, the smaller hydrocarbon molecule content (that is HCs with two or three carbon atoms) generated in the exhaust for E85 may be significantly higher (80% by volume) than that generated in the exhaust for gasoline (50% by volume). As such, the low adsorption efficiency and low retention temperature for such small HCs, such as ethylene, by commonly used HC trap adsorbents, makes their removal from engine exhaust difficult. The irreversible adsorption of larger HCs (that is HCs with more than three carbon atoms) to commonly used hydrocarbon trap adsorbents with high adsorption efficiency makes purging of such large HCs, such as toluene and iso-octane, difficult, leading to coking and blockage in HC traps.

In one example, some of the above issues may be addressed by a method comprising flowing exhaust gas over a hydrocarbon trap, the trap having a plurality of layers of different porosity and/or of a different adsorptive affinity to selected hydrocarbon chains, and flowing hydrocarbons from a fuel tank over the hydrocarbon trap.

In another example, some of the above issues may be addressed by a method of operating an engine having a hydrocarbon retaining system coupled to an engine exhaust, an engine intake, and a fuel tank, said hydrocarbon retaining system including a first zeolite layer with a first pore size, and a second zeolite layer with a second pore size, said first pore size being smaller than said second pore size. The method may comprise, during an engine cold start, routing exhaust gas to the hydrocarbon retaining system to store hydrocarbons in the hydrocarbon retaining system. The method may also comprise flowing hydrocarbons generated from fuel vapors of the fuel tank to the HC retaining system for storage in the HC retaining system. The method may further comprise, during a purging condition, purging the hydrocarbon retaining system with at least a purging gas, and directing the purging gas to the engine intake.

As described herein, in one example, layered zeolites of differing porosity may be used to trap HCs of differing carbon-chain length. By providing differing porosity zeolites in different layers, and by further including differing chemical and physical adsorptive functions, large hydrocarbons may be physically adsorbed for improved purging while smaller hydrocarbons may be chemically adsorbed for improved storing. In doing so, the temperature range for storing and purging operations may be brought within a desired range. By using a layered approach, storing and purging may occur with gas flow in the same direction. However, reversing flow systems for storing versus purging may also be used. Alternatively, a staged approach may also be used. Finally, in one example, by positioning the smaller porosity layer below the larger porosity layer, an upper layer of larger pore zeolites may provide protection to the lower layer of smaller pore zeolites from large hydrocarbon species during both HC storing and/or purging operations.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2A shows an example embodiment of a layered HC trap.

DETAILED DESCRIPTION

Figure 1:
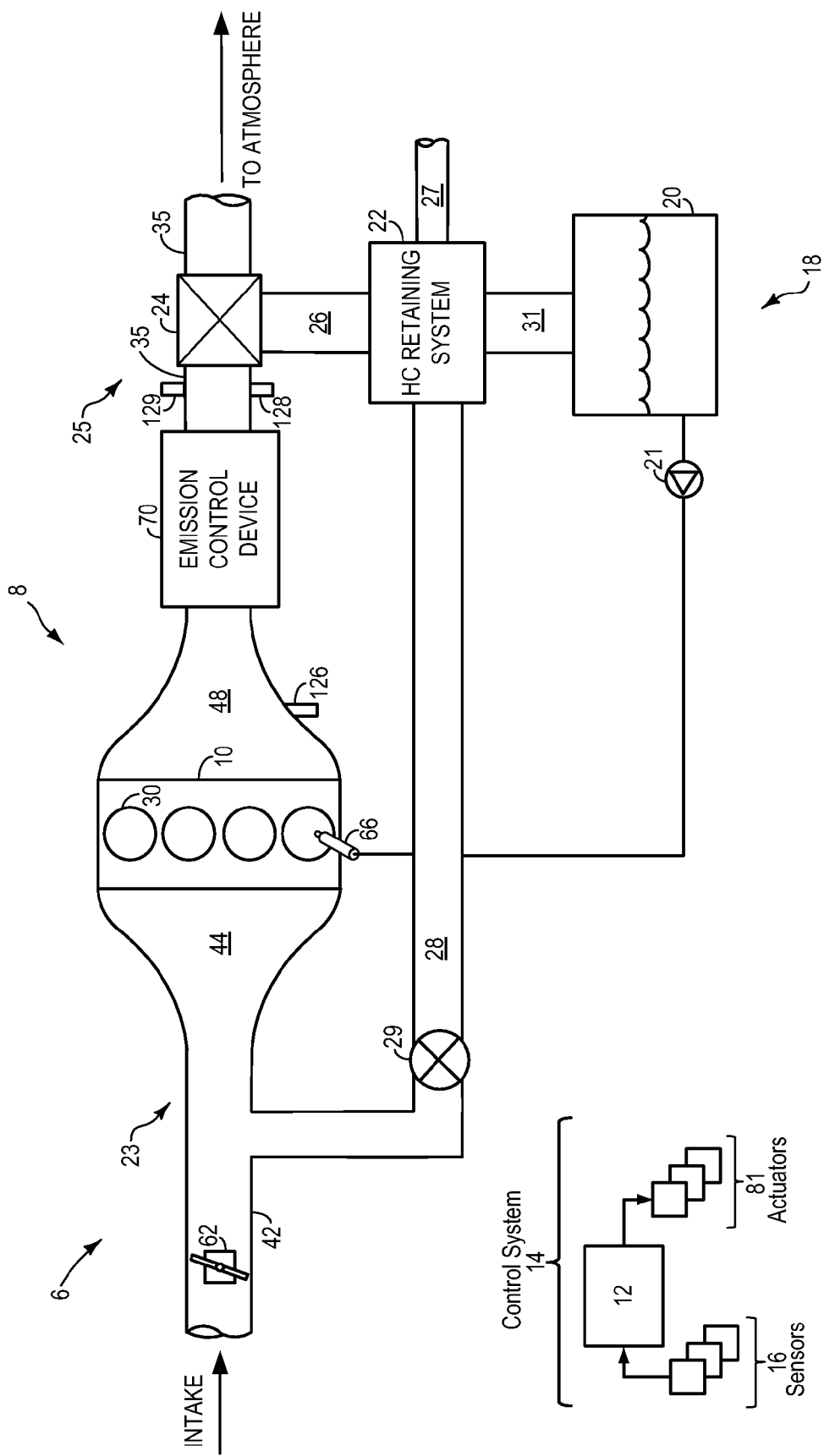
FIG. 1 shows a schematic depiction of an engine and an associated hydrocarbon retaining system.
Figure 2B:
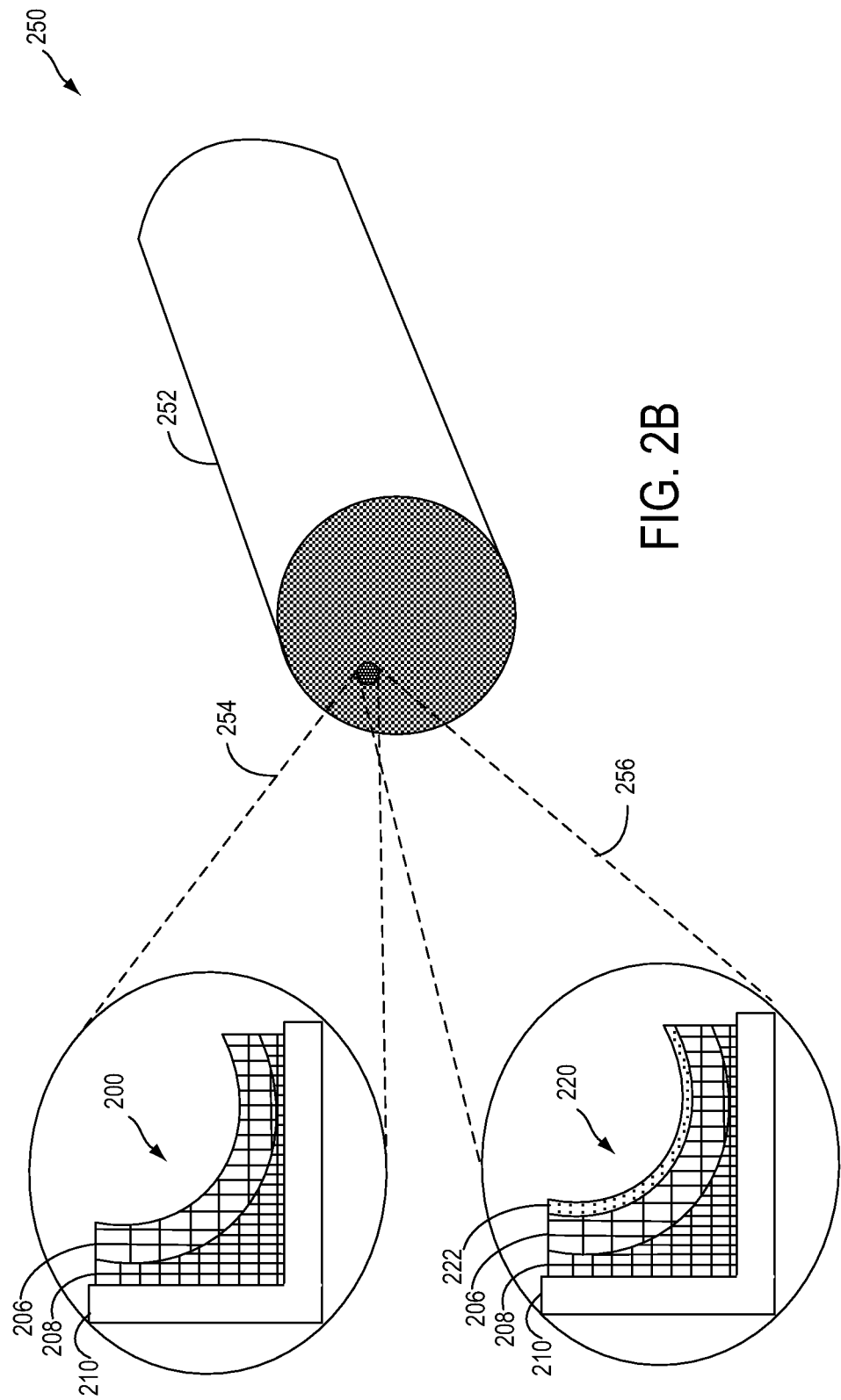
FIG. 2B shows the cross-section of a layered HC trap with two example embodiments, including the embodiment of FIG. 2A.
Figure 3:
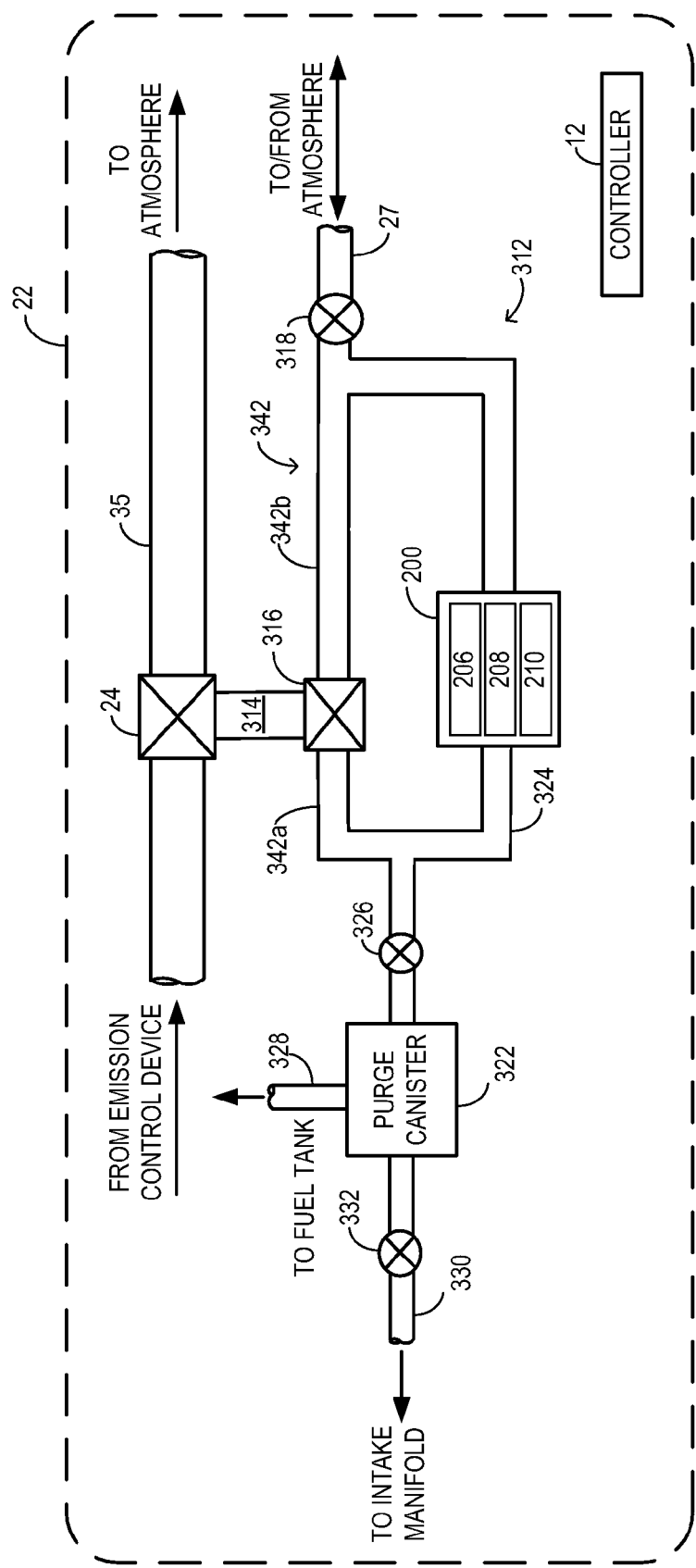
FIG. 3-5 show alternate embodiments of the hydrocarbon retaining system of FIG. 1 incorporating the layered HC trap of FIG. 2.
Figure 4:
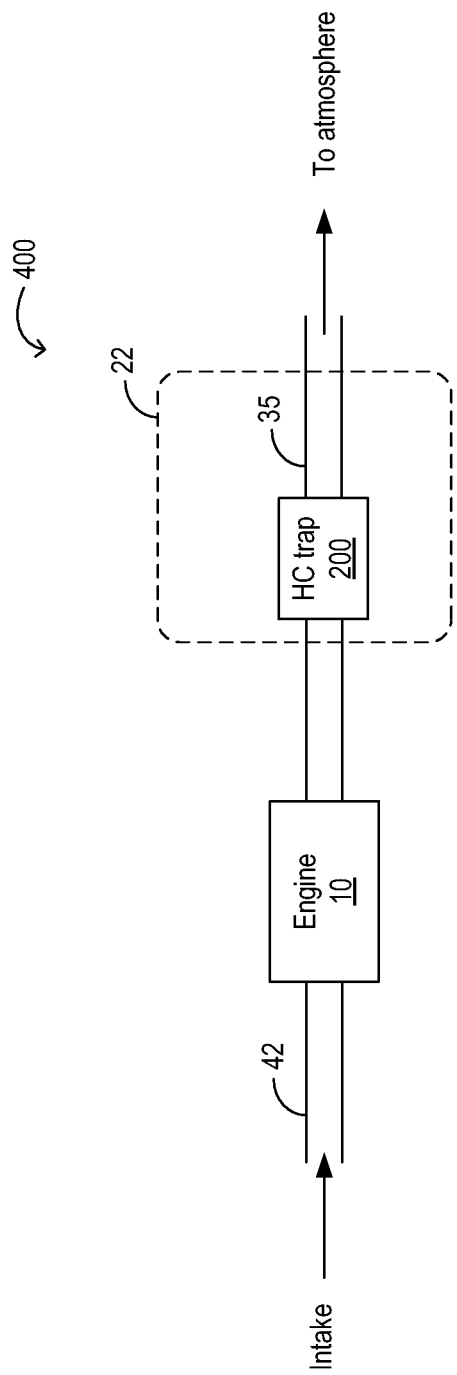
Figure 5:
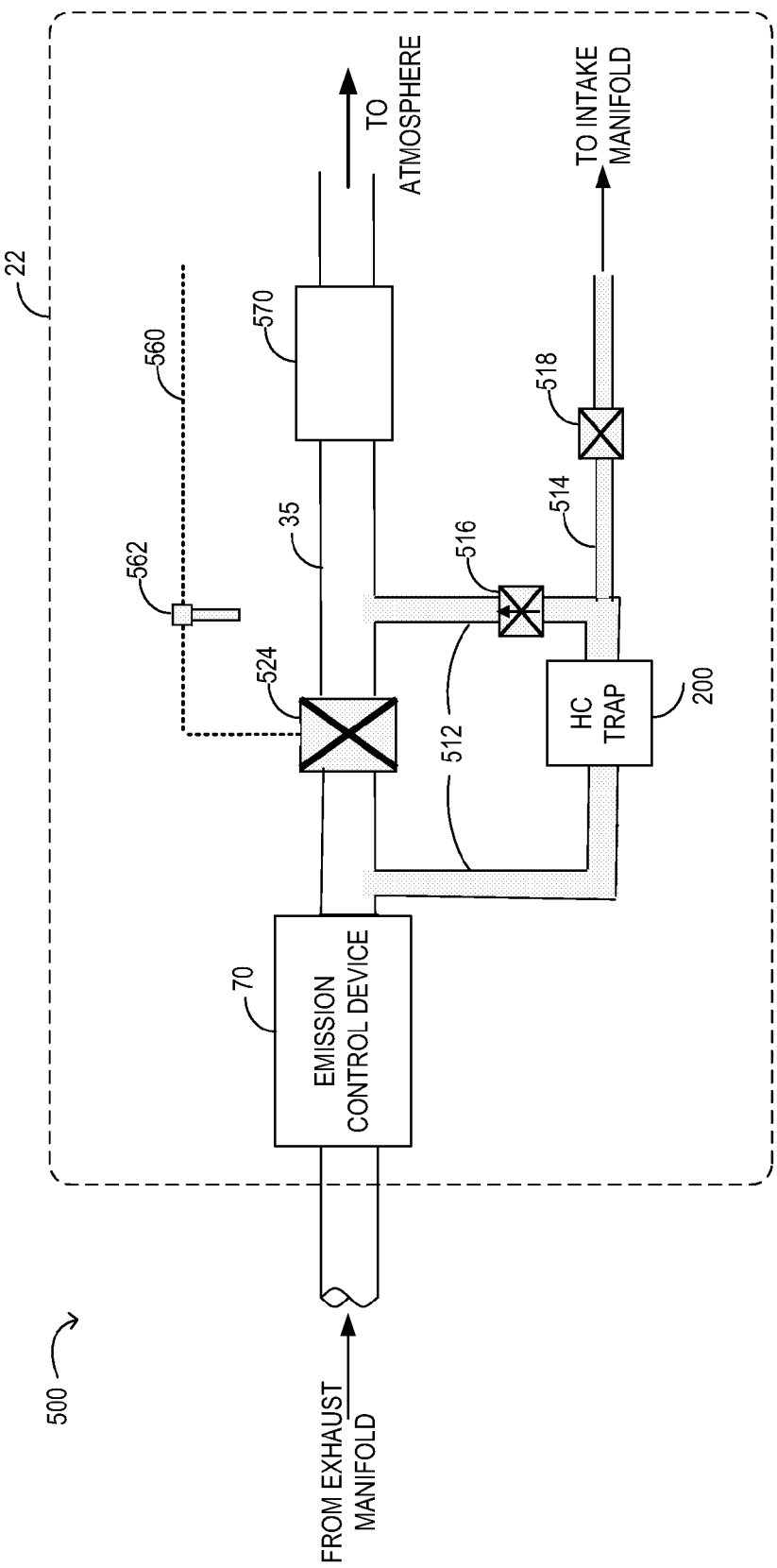

The following description relates to systems and methods for storing and purging hydrocarbons in an internal combustion engine, with an associated HC retaining system, as depicted in FIG. 1. In the depicted example, the HC retaining system includes a HC trap. As shown in FIGS. 2A-B, the hydrocarbon (HC) trap comprising layers of differing porosity and/or differing chemical and physical adsorption characteristics may be used. In some embodiments of the HC trap, a catalyst washcoat layer may be optionally added on top of the layers of differing porosity and/or adsorption characteristics. By using such a layered trap, the adsorption efficiency of the trap may be extended to a broader range of hydrocarbons (HCs), in particular to small length hydrocarbons. Additionally, the temperature range of adsorption and desorption may be brought within a desired range. The HC trap may be arranged in differing embodiments, some examples of which are depicted in FIGS. 3-5.

FIG. 1 shows a schematic depiction of a vehicle system 6. The vehicle system 6 includes an engine system 8 coupled to a hydrocarbon (HC) retaining system 22 and a fuel system 18. The engine system 8 may include an engine 10 having a plurality of cylinders 30. The engine 10 includes an intake 23 and an exhaust 25. The intake 23 includes a throttle 62 fluidly coupled to the engine intake manifold 44 via an intake passage 42. The exhaust 25 includes an exhaust manifold 48 leading to an exhaust passage 35 that routes exhaust gas to the atmosphere. The exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors, as further elaborated in the example engine embodiments of FIGS. 3-5.

The exhaust 25 may also be operatively coupled to HC retaining system 22 via conduit 26 and valve 24. In one example, exhaust gases may be routed to the hydrocarbon retaining system 22 during engine cold start operation. Then, once the emission control device 70 has reached its operating temperature, the HCs retained in system 22 may be purged to the engine via intake 23, as described below herein. In alternate embodiments, HC retaining system 22 may be situated along exhaust passage 35.

Fuel system 18 may include a fuel tank 20 coupled to a fuel pump system 21. The fuel pump system 21 may include one or more pumps for pressurizing fuel delivered to the injectors of engine 10, such as the example injector 66 shown. While only a single injector 66 is shown, additional injectors are provided for each cylinder. It will be appreciated that fuel system 18 may be a return-less fuel system, a return fuel system, or various other types of fuel systems. Vapors generated in the fuel system 18 may be routed to HC retaining system 22, described further below, via conduit 31, before being purged to the engine intake 23.

The fuel tank 20 may hold a plurality of fuel blends, including fuel with a range of alcohol concentrations, such as various gasoline-ethanol blends, including E10, E85, gasoline, etc., and combinations thereof.

HC retaining system 22 may include one or more HC retaining devices, such as a HC trap or a HC trap assembly configured to temporarily trap HCs from entering gases. HC retaining system 22 may further include a vent 27 which may route gases out of the retaining system 22 to the atmosphere when storing or trapping HCs from the exhaust 25 and/or fuel system 18. Vent 27 may also allow fresh air to be drawn into HC retaining system 22 when purging stored HCs from the exhaust 25 and/or fuel system 18 to the intake 23 via purge conduit 28 and purge valve 29. While the example shows vent 27 communicating with fresh, unheated air, various modifications may also be used. For example, heated intake air from an air cleaner box may be used. Alternatively, fresh air may be received via a purge canister coupled in the fuel vapor recovery system. Further, heated exhaust gas may be used under selected conditions. A detailed system configuration of HC retaining system 22 is described herein below with regard to FIGS. 3-5. Further, various additional components may be included in the intake, exhaust, and fuel system, such as a muffler downstream of valve 24.

The vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure and temperature sensors, and/or composition sensors may be coupled at various locations in the vehicle system 6, as discussed in more detail herein. As another example, the actuators may include fuel injector 66, valve 29, valve 24, and throttle 62. Control system 14 may include a controller 12. The controller may receive input data from the various sensors 16, process the input data, and trigger the actuators 81 in response to the processed input data based on instruction or code programmed therein corresponding to one or more routines.

HC retaining system 22 can operate to store HCs from a plurality of sources, including the engine exhaust 25 and the fuel system 18, concurrently or during different operating conditions. Under some operating conditions, such as during engine cold start when the emission control device is not yet at its light-off temperature (e.g., a temperature at which the device reaches a selected, sufficiently high, conversion efficiency for a particular exhaust constituent), exhaust gas may be routed from the exhaust 25 to the HC retaining system 22, and then to the atmosphere through vent 27. In this way, an increased amount of cold start HC emissions may be stored in HC retaining system 22 while the exhaust gases heat emission control device 70. Then, once device 70 reaches sufficient operating temperature, exhaust gases may be routed to the atmosphere through conduit 35 and the HC retaining system 22 may be substantially isolated from the engine exhaust gas. Additionally, fuel vapors generated in the fuel tank 20 may be routed to HC retaining system 22 for storage before being delivered to the engine intake 23 and combusted in the engine 10. These different storing modes (from engine exhaust 25, and from fuel system 18) may be carried out concurrently, separately, or in combinations thereof.

After being isolated from the exhaust gas, the HC retaining system 22 may be coupled to the engine intake 23 to draw fresh air through vent 27 and purge the stored HCs into the engine intake to be combusted in the engine. Such purging operation may occur during selected engine operating conditions as described herein. Alternatively, the stored hydrocarbons may be purged using cleaned exhaust gas. In still other examples, the stored hydrocarbons may be purged using a temperature controlled combination of cleaned exhaust gas and fresh air. In this way, during a purging condition, the HC retaining system may be purged with at least a purging gas, following which the purging gas may be directed to the engine intake. Based on the operating conditions, and the desired purging temperature, the purging gas may be exhaust gas, fresh air (heated or unheated), or any combination thereof.

Hydrocarbon retaining system 22 may include one or more of hydrocarbon retaining devices, such as HC traps (or trap assemblies) and canisters. The HC trap may be in the form of a brick comprising a base substrate layered with one or more appropriate HC adsorbents. The adsorbents may include micropore (0-2 nm pore size range) or mesopore (2-50 nm pore size range) activated carbon and/or zeolites. Example embodiments of a HC trap are further elaborated herein with reference to FIGS. 2A-B.

FIG. 2A shows an example embodiment of a layered HC trap 200. The trap may be configured with a plurality of layers of different porosity and/or different adsorptive affinity to selected hydrocarbons chains. In one example, the HC trap may include a first layer with a first pore size and a second layer with a second, larger, pore size. Further, the layers may be supported by a base substrate. Each layer may include appropriate adsorbents for the adsorption of selected hydrocarbon chains. In one example, the adsorbents used in both layers may be zeolites. Accordingly, the first zeolite layer may have a first adsorptive affinity to selected hydrocarbon chains, and the second zeolite layer may have a second adsorptive affinity to the selected HC chains, the second affinity being greater than the first affinity. In another example, at least one of the layers may include activated carbon, such as granular activated carbon. For example, activated carbon may be included in the second layer with the larger pore size and the greater affinity to selected HC chains, while zeolites may be included in the first layer with the smaller pore size and the lower affinity to selected HC chains.

As depicted, HC trap 200 consists of a base substrate 210 which may be wash-coated with two layers of adsorbent, 206 and 208. The base substrate may have a honeycomb structure to provide a large surface area for adsorption. The base substrate 210 may be made of ceramic, cordierite, metal, or another appropriate substrate. Additionally, the base substrate may be of a high porosity variety with a porosity of 30 to 95%. In one example, the base substrate may have a diameter of 4.66 inches and a length of 3.5 inches. The first layer of adsorbent with the smaller pore size may be coated on the base substrate to form a lower layer. Similarly, the second layer of adsorbent with the larger pore size may be coated on the first layer to thereby form an upper layer. That is, the first layer may be interposed between the second layer and base substrate, while the second layer may be interposed between the first layer and the exhaust gas.

The adsorbents may be selected such that a maximum amount of HCs may be adsorbed during HC storing while allowing maximum desorption of HCs during HC purging at a low enough temperature without aging the trap. As such, the adsorbents should also have high durability to prevent deterioration due to heat or poisoning from the exhaust gas. The trap constituents may be encased in a HC trap housing (not shown) made of plastic or steel, for example.

The adsorbents used may differ in porosity and chemical characteristics. In one example, as depicted, the adsorbents used may be zeolites of differing porosity and chemical characteristics. By using adsorbents of differing porosity, a molecular sieve effect may be used in the retention of the HCs. Thus, upper layer 206 may include an adsorbent of larger porosity, such as macroporous zeolite, for trapping large HCs 202 of carbon chain size greater than 3 carbons, while lower layer 208 may include an adsorbent of smaller porosity, such as microporous zeolite, for trapping small HCs 204 of carbon chain size between 2-3 carbons. Additionally, the zeolites may be configured with differing physical and chemical adsorptive functions. Thus, upper layer 206 may be configured with a first adsorptive affinity to selected hydrocarbons, and lower layer 208 may be configured with a second adsorptive affinity to the selected hydrocarbons. Herein, the selected hydrocarbons may be long chain HCs with a carbon chain size greater than 3 carbons, such as toluene and isooctane, for example. The adsorbents used in the upper and lower layers may be selected such that their adsorptive affinities provide a desirable mix of chemical adsorptive and physical adsorptive properties. As such, HC adsorbents with only chemical adsorptive functions may not be desirable due to their tendency to form strong chemical bonds with the HCs. As such, this may lead to higher desorption temperatures, and eventual trap poisoning due to chemical bonding with exhaust gas constituents. In contrast, HC adsorbents with only physical adsorptive functions form significantly weaker bonds through Van der Waals interactions only. Zeolites may be desirable for use as HC adsorbents due to the large range of adsorption strength and desorption temperatures that may be available based on the varying silica to alumina ratio in the zeolite. Alternatively, activated carbon may also be used. In one example, zeolites with higher silica to alumina ratios, such as TEX-0257, may have a larger ratio of physical adsorptive function to chemical adsorptive functions. By adding metals to these zeolites, such as copper-added zeolite REX-2011 or iron-added zeolite REX-2032, the chemical adsorptive properties of the zeolites may be enhanced. In this way, by using zeolites of differing porosities and differing adsorptive affinities, HC trap 200 may be effectively used as a zeolite emission control device. By including metal-exchanged zeolites in at least one of the first and second zeolite layers, the range of adsorptive affinities available in the HC trap may be substantially broadened.

Upper layer 206 may include a base zeolite such as HCTF-1, JM39208A2, TEX-0257, or ZSM-5. In one example, the base zeolite may be impregnated at 400 cpsi/4.5 mil. In another example, the base zeolite may be impregnated at 350 cpsi/4.5 mil. Herein, the stored hydrocarbon forms a weak chemical bond with the alumina ion. Thus, the adsorptive function is mostly physical in nature and the strength of binding substantially depends on the pore diameter of the zeolite vis-a-vis the size of the HC molecule. The closer the molecular diameter of the HC to the zeolite pore diameter, the stronger the physical adsorptive function, and thus the higher the desorption temperature. Thus, in upper layer 206, by using a base zeolite such as TEX-0257 of slightly higher pore diameter than the predominant large HC species 202 in cold start emissions (such as toluene and isooctane), higher rates of adsorption and desorption of large HC species within desired temperature ranges can be achieved. It will be appreciated that in this approach, the small HC species may be completely excluded from the larger porosity upper zeolite layer, as they may directly migrate on to the smaller porosity lower zeolite layer where they may be held more strongly by the greater chemical adsorptive affinity of the lower layer.

Lower layer 208 may include ion-exchanged zeolites such as copper-exchanged or iron-exchanged zeolites. In one example, the ion-exchanged zeolite may be impregnated at 400 cpsi/4.5 mil. In another example, the ion-exchanged zeolite may be impregnated at 350 cpsi/4.5 mil. Herein, the adsorptive function may be mostly chemical. Additionally, the pore diameter may be adjusted to prevent the entry of large HC species by a molecular sieve effect. In this way, the layer allows trapping of small HC species 204, such as ethylene and propylene, by both physical and chemical adsorptive properties.

During HC storing operations, exhaust may flow through HC trap 200, through layers 206 and 208, so as to allow large HC species 202 such as toluene ($C_7H_8$) to be trapped inside the zeolite cage of upper zeolite layer 206 largely by physical adsorption. Smaller and weakly adsorbed HC species 208 such as ethylene ($C_2H_4$) may then migrate on to lower zeolite layer 208 wherein they may be chemically, and/or physically, adsorbed.

After the bulk exhaust stream has warmed up, the warmed exhaust stream, or a purging gas, may be passaged through HC trap 200. The heated exhaust allows the hydrocarbons to be desorbed from the respective zeolite layers. Based on the operating condition and/or the desired temperature of the purging gas, the purging gas may be exhaust gas, fresh air, or a combination thereof.

FIG. 2B shows a cross-sectional view 250 of a layered HC trap monolith 252. At 254, the cross-section of the channels depict the layered embodiment of HC trap 200 as previously elaborated with respect to FIG. 2A (including base substrate 210, lower layer 208 and upper layer 206). At 256, the cross-section of the channels depict an alternate embodiment 220 of the layered HC trap wherein an additional catalyst (for example, a three-way catalyst) washcoat layer 222 has been added on top of upper layer 206. That is, the HC trap includes a third layer coated on the second layer. In this embodiment, following the purging operation, the released hydrocarbons may be oxidized over the catalyst washcoat using oxygen. It will be appreciated herein that the cage-like structure of the metal-exchanged zeolites included in lower layer 208 allow the HC species to be held at the metal ion sites (for example, at the site of the aluminum ions) until the precious metal catalyst included in the washcoat layer 222 is hot enough to oxidize the released HC species.

In this way, the upper layer may trap large HC species strongly by physical adsorption but not trap small HC species, while weakly adsorbed and/or smaller HC species may migrate to the lower layer and get chemically adsorbed therein. Large HCs may be prevented from entering the lower layer both by the smaller fixed pore size of the lower layer in addition to the buffering function of the upper layer. By combining different zeolites in a layered configuration, the adsorption efficiency of the HC trap may be enhanced and the range of species that can be trapped may be broadened. During a purging operation, the flow of heated gas over the HC trap better enables the adsorbed HCs to be dislodged from their respective layers. As such, the configuration of the trap with the layered adsorbents enables storing and purging to occur with gas flow in a single direction. Thus, in contrast to configurations wherein adsorbents of different natures are staged, a reverse flow of gas during a purging operation (versus a storing operation), and related conduit and valve configurations, are not necessitated. However, it will be appreciated that reversing flow systems for storing versus purging may also be used with the layered HC trap of the present disclosure. When a reverse flow system is used, the presence of the larger porosity adsorbent layered on top of the smaller porosity adsorbent better enables the large HC species do not need to pass through the smaller pored zeolite layer to leave the HC trap.

FIG. 3 shows one embodiment of hydrocarbon retaining system 22 including hydrocarbon retaining devices, such as HC trap 200, arranged in parallel with exhaust conduit 35, downstream of the emission control device. An exhaust conduit valve 24 is located in the exhaust conduit 35 for blocking exhaust flow during a first mode, and allowing exhaust flow to pass during a second mode. A branched bypass conduit 312 is coupled to the exhaust conduit valve 24 via connecting conduit 314. Bypass conduit 312 includes two branches namely upper passage 342 and lower passage 324. Upper passage 342 may be further divided into passage 342a (allowing communication of gases from conduit 314 with passage 324), and passage 342b (allowing communication of gases from conduit 314 with vent 27). Bypass conduit 312 is fluidly coupled to connecting conduit 314 through bypass valve 316. Both branches of bypass conduit 312 may communicate with the atmosphere via bypass valve 318. Bypass 312 further includes layered HC trap 200, comprising upper (zeolite) layer 206, lower (zeolite) layer 208 and base substrate 210, in the lower branch passage 324. The bypass conduit 312 leads to the atmosphere through vent 27, and optionally through valves 314 and 24, and exhaust conduit 35.

HC trap 200 may be fluidly coupled to a purge canister 322 via passage 324. The purge canister 322 may be configured to collect vapor from the fuel system, such as via a conduit 328 leading to the fuel tank. The passage 324 may include a valve 326. The purge canister 322 may also be fluidly coupled to the engine intake via a conduit 330 and valve 332.

Specifically, in this example, valve 24 operates as a diverter valve to either allow exhaust gas flow through conduit 35 to the atmosphere, or to direct the exhaust gas flow to conduit 314 and valve 316. Herein, valve 316 is another diverter valve which either allows communication between conduit 314 and passage 324 via passage 342a, or conduit 314 and vent 27 via passage 342b and valve 318. A valve 326 is shown for controlling flow leading to, or coming from, the purge canister 322, which then leads to the fuel tank via conduit 328.

While this example shows two hydrocarbon retaining devices (e.g., HC trap 200 and purge canister 322), various alternatives may be provided. For example, a single HC trap may be used, where the HC trap operates to store both exhaust HCs as well as fuel tank vapors. Further, the hydrocarbon retaining devices may each be canisters, bricks or HC traps. Irrespective of the particular configuration of the HC retaining system, the hydrocarbon retaining devices can receive routed cold start hydrocarbons and retain the hydrocarbons.

The HC trap 200 may include a plurality of zeolite layers (two depicted herein). Zeolite layers 206 and 208 may comprise zeolites of differing sizes (for example, differing porosities) and/or chemical characteristics (for example, differing physical and chemical adsorptive abilities), as previously elaborated in FIG. 2. In one example, the HC trap may comprise an upper layer of base zeolite TEX-0257 and a lower layer of copper-exchanged zeolite REX-2011, the zeolite layers contained within a plastic housing. As such, a plastic housing may be used since the exhaust gas temperatures encountered in the trap may be substantially lower than the full range of exhaust temperatures experienced in the exhaust system. Herein, the plastic housing provides the advantage of reduced costs and improved reliability. However, at higher temperatures (for example above 100° C.), the plastic housing is prone to deformation. Thus, in another example, the trap may comprise a metal housing that is more resistant to heat deformation, such as a steel housing. Purge canister 322 may also include zeolites, although of a different porosity. Alternatively, purge canister 322 may include granular activated carbon.

During HC storage, the gases may flow through layers 206 and 208, such that HC molecule size in the gas is progressively reduced. Additionally, since stored HC molecules may be difficult to remove from the smaller pore zeolite layer, the lower layer may be buffered by the larger pore size zeolite to inhibit HC molecules from being irreversibly absorbed onto the smaller pores. Desorption may be performed using heated exhaust. In this way, the larger pores better protect the smaller pores and reduce irreversible adsorption of larger HC molecules into the smaller pores. The adsorption of small HC species into the smaller pore layer may better respond to pressure, such as approximately 5 MPa, which can be provided by appropriately sizing the inlet piping diameter from the diverter valve to the canisters. Similarly, removal of the HC species may benefit from increased temperatures, such as through heat transfer from exhaust gas, or by using at least some cleaned exhaust gas, such as during idle conditions.

The configuration of FIG. 3 also allows for opposite flow direction during storage and purging operation, although this is not necessitated. In a reverse flow system, during storage of HC in the exhaust gas, the diverter valves 24 and 316 and bypass valve 318 route the exhaust gas through conduit 314 and passage 342a and 324 on to HC trap 200 before being vented via 27. During purging of the traps, the valves are adjusted to route fresh air through vent 27 on to HC trap 200 through layers 208 and then 206, before being delivered through passage 324 and valve 326 on to the intake manifold. Additionally, or optionally, purging of the traps with preheated air from an air cleaner box or hot vehicle exhaust, or a temperature controlled combination thereof, may be used to provide improved performance. In this way, improved storage and release of HCs can be achieved, especially in light of the differential characteristics (e.g., porosity) of the trap layers.

A pressure sensor (not shown) may also be included in HC trap 200 to measure a pressure difference across the assembly. Specifically, the pressure sensor may measure a pressure difference across the different layers of HC trap 200. The pressure difference may be used by controller 12 to calculate a HC load level. The data may be consequently used as an input for determining whether to continue or stop a HC storing operation and/or whether to start or stop a HC purging operation. The pressure differential across the layers of the HC trap assembly may also be measured during the trapping or purging operation as an indication of the presence of a flow restriction. It will be appreciated that additionally or optionally, a fuel vapor/hydrocarbon sensor coupled to the trap assembly may be used to directly measure the effectiveness of the trap during trapping since any degradation in the trap would result in a substantial increase in the HC breakthrough at vent 27. The same may also be used to identify aging of the adsorbent in use in the HC trap layers given that desorption of HCs reduces significantly with aging of the HC trap.

The hydrocarbon retaining system 22 may be operated by a controller in a plurality of modes by selective adjustment of the various valves. For example, the following operating modes may be performed:

MODE A: Exhaust Hydrocarbon Storage

During select engine and/or vehicle operating conditions, the controller 12 may adjust valve 24 to divert exhaust gas to conduit 314, and adjust valve 316 to divert exhaust gas to conduit 312 (specifically to passage 324). Additionally, the controller may close valves 332 and 326 but leave valve 318 open. Example operating conditions include cold engine starting operation before the emission control device has reached a light-off temperature. In this mode, exhaust from engine 10 is routed via HC trap 200, before exiting to the atmosphere via valve 318 and vent 27. During this operation, the purge canister 322 is isolated from the exhaust gas and hydrocarbon trap assembly.

MODE B: Fuel Vapor Storage

During select engine and/or vehicle operating conditions, the controller 12 may adjust valve 24 to direct exhaust gas through conduit 35, and isolate the hydrocarbon trap 200 from exhaust gas. Additionally, the control may open valve 326 and valve 318, and close valve 332. In this mode, at least some fuel tank vapors are routed through and retained in both purge canister 322 and HC trap 200 before being vented through vent 27.

MODE C: HC Trap and/or Canister Purging

During select engine and/or vehicle operating conditions, the controller 12 may adjust valve 24 to divert exhaust gas through conduit 35, and adjust valve 316 to prevent fresh air from entering conduit 314. In doing so, the hydrocarbon trap 200 may be isolated from the exhaust gas. Additionally, the controller 12 may open valve 326, and controllably open valve 332 and valve 318 such that fresh air is drawn through vent 27 to purge HC trap 200, and purge canister 322 through conduit 330 and valve 332 to the engine intake. In this mode, the purged fuel vapors from the canister and/or HC trap are combusted in the engine, while exhaust gas is routed through conduit 35 to the atmosphere after treatment by the emission control device.

In an alternative embodiment, rather than drawing in fresh air via vent 27 for purging stored hydrocarbons, the system may additionally or alternatively route exhaust gases to the vent to enable heated exhaust to heat the hydrocarbon retaining system and better purge stored hydrocarbons. Such operation may be used during specific conditions, such as cold ambient temperatures. Further, under some conditions, the system may intentionally route cleaned exhaust gases during the storing mode for a longer duration to heat the hydrocarbon retaining system to a higher temperature, thereby improving the subsequent purging operation. In one example, before a purging operation, exhaust gases may be routed to the hydrocarbon retaining system (even during non-starting conditions) to increase temperature and improve the subsequent purging efficiency. This operation may be used when temperature of the hydrocarbon retaining system falls below a threshold value, or when reduced purging opportunities are present.

Similarly, during a purging operation, cleaned exhaust gases may be routed through the hydrocarbon retaining system to allow for improved purging. Alternatively, fresh air heated by passage through the cleaner box may be used for purging operations. In another example, the cleaned exhaust gases may be combined with fresh air to obtain a purging gas that is at a lower temperature.

While the depicted example shows combined purging of the fuel tank vapors and stored exhaust hydrocarbons, in alternative configurations these may be purged independently. For example, HC trap 200 may be purged via a purge line in parallel with a purge line of the purge canister, to thereby enable separate and/or independent purging of the different hydrocarbon storage systems. Further, one hydrocarbon retaining device may be purged without purging a second hydrocarbon retaining device. Further still, the fuel tank vapors in the purge canisters may be purged sufficiently faster than the hydrocarbons in the HC trap. As such, during initial purging, the learned vapor amount/concentration can be used to determine the amount of fuel vapors stored in the canister, and then, during a later portion of the purging operation (when the canister is sufficiently purged or empty), the learned vapor amount/concentration can be used to estimate a loading state of the HC trap (that was generated during the most recent storing operation, such as the most recent cold start event).

Further still, while the depicted example shows non-concurrent storing of exhaust gas hydrocarbons and purging of the retaining system 22, in alternative embodiments, some stored hydrocarbons may be purged during storage of other hydrocarbons.

FIG. 4 shows an alternate embodiment 400 of HC retaining system 22 wherein layered HC trap 200 is aligned to intake passage 42 and engine 10. Herein, HC trap 200 is placed along exhaust passage 35, for example downstream of an emission control device (not shown) to allow a direct interaction of the emitted exhaust gas with the HC trap. It will be appreciated that herein by using the layered HC trap, HC storing and purging may be performed using the same direction of flow of a purging gas and without the need for additional conduits and valves.

FIG. 5 shows still another embodiment 500 of HC retaining system 22 wherein HC trap 200 is located in an exhaust system bypass loop. Herein, the exhaust gases may be sent through the layered zeolite HC trap 200 only during cold start for HC storing operations. HC desorption may occur slowly as a downstream three way catalytic converter (TWC) warms up. The warmed TWC may then burn the desorbed HCs. A periodic hot purge of the trap may be enabled to allow complete cleaning of the HC trap.

Embodiment 500 shows HC trap 200 arranged in parallel with exhaust conduit 35, downstream of the emission control device 70. An exhaust conduit valve 524 is located in the exhaust conduit, in between emission control device 70 and muffler 570, for blocking exhaust flow during a first mode, and allowing exhaust flow to pass during a second mode. Muffler 570 may include a three way catalytic convertor (not shown). As depicted, valve 524 may be a diverter valve. In one example, diverter valve may be actuated electrically by a solenoid. In another example, as shown, diverter valve 524 may be vacuum actuated. The flow of vacuum to valve 24, provided along vacuum line 560, may be controlled by vacuum valve 562. In one example, the vacuum used to actuate diverter valve 24 may be generated in the intake manifold, for example during throttling.

Herein, HC trap 200 is located in EGR bypass loop 512, coupled to the exhaust conduit 35 upstream and downstream of diverter valve 524. EGR bypass loop 512 is fluidly coupled to the intake manifold though conduit 514 and EGR valve 518. Exhaust routed through conduit 512 via HC trap 200 may be returned to exhaust conduit 35 upon passage through valve 516. As depicted, valve 516 may be a one-way valve.

During cold start, diverter valve 524 may be adjusted to allow cold start exhaust to be diverted through bypass conduit 512, on through HC trap 200. During this operation, valve 518 may remain closed while valve 516 may be opened. Thus, exhaust may flow through layered zeolite HC trap 200, wherein larger HCs may be retained in upper layer 206 while smaller HCs are retained in lower layer 208. The exhaust may then pass through muffler 570 and the associated TWC, before being vented to the atmosphere. In this way, HC storing may be enabled.

When purging conditions have been met, for example when the TWC has reached light off temperature, diverter valve 524 may be adjusted to route exhaust into bypass loop 512. EGR valve 518 may be kept open while valve 516 may be closed. As such, valve 516 may remain closed due to insufficient pressure across the one way valve to keep it open. During the purging operation, the heated exhaust may flow through HC trap 200 allowing desorption of the HCs from the zeolite layers following which the HCs may be directly routed to the engine intake manifold through EGR valve 518. By avoiding routing the purged HCs through an additional purging canister, a greater fraction of desorbed HCs may be ingested back to the engine intake manifold, thereby increasing the efficiency of the purging operation. It will be further appreciated that in this embodiment, by using a layered HC trap, a purging gas may be flowed in the same direction for both the storing and purging operations.

In this way, by using layers of differing porosity and of differing physical and/or chemical adsorptive attributes, the range of HCs that may be adsorbed by a HC trap may be significantly increased. In one example, when using a layered zeolite based HC trap, the larger pore size and higher physical adsorption ability of base zeolites included in an upper layer of the HC trap may be used to adsorb large HCs, while the smaller pore size and high chemical adsorption ability of ion-exchanged zeolites included in a lower layer of the HC trap may be used to adsorb small HCs. By using ion-exchanged zeolites with higher chemisorption ability, small HCs with otherwise weak adsorption properties may also be retained. Given that small HCs form a large component of cold start emissions when operating an engine with an alcohol-based fuel (such as E85), by using a layered HC trap, the quality of cold start emissions when operating an engine with an alcohol blend fuel can be substantially improved. In one example embodiment, by placing the layered zeolite trap in an EGR bypass loop, a larger fraction of trapped HCs can be desorbed directly into the engine intake manifold, without requiring prior routing through a purge canister. Further, by using a layered trap instead of a multi-staged trap, purging can be achieved using a unidirectional flow of exhaust and without requiring additional conduits for reverse flow of exhaust during purging.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and nonobvious combinations and subcombinations of the various systems and configurations, and other features, functions, and/or properties disclosed herein.

The invention claimed is:

1. A method comprising:
    flowing exhaust gas from an inlet to an outlet of a hydrocarbon trap, the trap having a plurality of layers of different porosity and/or of different adsorptive affinity to hydrocarbon chains;
    flowing fuel tank hydrocarbons from the inlet to the outlet of the hydrocarbon trap; and
    flowing a purging exhaust gas from the outlet to the inlet of the hydrocarbon trap.

2. The method of claim 1 further comprising, routing the purging exhaust gas to an engine intake manifold, wherein the flowing a purging exhaust gas includes carrying away exhaust hydrocarbons and fuel tank hydrocarbons adsorbed in the hydrocarbon trap.

3. The method of claim 1 further comprising, mixing the routed purging exhaust gas with engine intake air, and combusting the routed purging exhaust gas with engine intake air in a combustion chamber of an engine.

4. The method of claim 1 wherein the plurality of layers includes a first zeolite layer with a first, smaller pore size, and a second zeolite layer with a second, larger pore size, the second layer interposed between the first layer and the exhaust gas.

5. A method of operating an engine having a hydrocarbon retaining system coupled to an engine exhaust, an engine intake, and a fuel tank, said hydrocarbon retaining system including a first zeolite layer with a first pore size, and a second zeolite layer with a second pore size, said first pore size being smaller than said second pore size, the method comprising:
    during an engine cold start,
        routing exhaust gas in a first direction from an inlet to an outlet of the hydrocarbon retaining system to store exhaust hydrocarbons over a length of the hydrocarbon retaining system; and routing fuel tank vapors from the inlet to the outlet of the hydrocarbon retaining system to store fuel tank hydrocarbons over the length of the hydrocarbon retaining system; and during a purging condition, routing a purging exhaust gas in a second, opposite direction from the outlet to the inlet of the hydrocarbon retaining system to purge stored hydrocarbons from the length of the hydrocarbon retaining system, and directing the purging exhaust gas to the engine intake.

6. The method of claim 5 wherein the purging gas further includes fresh air.

7. The method of claim 5 wherein the first zeolite layer further has a first adsorptive affinity to selected hydrocarbon chains and wherein the second zeolite layer further has a second adsorptive affinity to the selected hydrocarbon chains, said second affinity being greater than said first affinity.

8. The method of claim 7 wherein the selected hydrocarbon chains are long chains.

9. The method of claim 5 wherein the first and second zeolite layers are supported by a base substrate.

10. The method of claim 9 wherein the first zeolite layer is coated on the base substrate to form a lower layer and the second zeolite layer is coated on the first zeolite layer to form an upper layer, and wherein at least one of the first and second zeolite layers include metal-exchanged zeolites.

11. The method of claim 10 wherein the base substrate has a porosity of 30 to 95%.

12. A system for a vehicle including an engine intake, an engine exhaust, and a fuel tank, the system comprising:

a hydrocarbon trap coupled to the engine intake, the engine exhaust, and the fuel tank, said hydrocarbon trap including a first zeolite layer with a first pore size and a first adsorptive affinity to selected hydrocarbon chains, and a second zeolite layer with a second pore size and a second adsorptive affinity to the selected hydrocarbon chains, the first pore size being smaller than the second pore size, said second affinity being greater than said first affinity; and a controller with computer readable instructions for,
storing hydrocarbons in the trap by flowing exhaust gas and fuel tank vapors in a first direction across a length of the trap, from an inlet to an outlet of the trap; and
purging the stored hydrocarbons by flowing a purge gas in a second, opposite direction across the length of the trap, from the outlet to the inlet of the trap.

13. The system of claim 12 wherein the first zeolite layer is coated on a substrate support to form an inner layer and the second zeolite layer is coated on the first zeolite layer to form an outer layer.

14. The system of claim 12 wherein the selected hydrocarbon chains are long chains.

15. The system of claim 13 wherein at least one of the first and second zeolite layers include metal-exchanged zeolites.

16. The system of claim 13 wherein the hydrocarbon trap further includes a third layer coated on the second layer, the third layer comprising a catalytic washcoat.

* * * * *